(12) United States Patent
Schell et al.

(10) Patent No.: US 9,906,255 B2
(45) Date of Patent: *Feb. 27, 2018

(54) APPARATUS AND METHODS FOR RECORDATION OF DEVICE HISTORY ACROSS MULTIPLE SOFTWARE EMULATIONS

(71) Applicant: Apple Inc., Cupertino, CA (US)

(72) Inventors: Stephan V. Schell, San Mateo, CA (US); Arun Mathias, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/045,008

(22) Filed: Feb. 16, 2016

(65) Prior Publication Data

US 2016/0164560 A1 Jun. 9, 2016

Related U.S. Application Data

(63) Continuation of application No. 14/188,623, filed on Feb. 24, 2014, now Pat. No. 9,281,855, which is a (Continued)

(51) Int. Cl.
*H04B 1/3816* (2015.01)
*H04W 12/06* (2009.01)
(Continued)

(52) U.S. Cl.
CPC ......... *H04B 1/3816* (2013.01); *G06F 3/0604* (2013.01); *G06F 3/067* (2013.01);
(Continued)

(58) Field of Classification Search
CPC ..... H04W 4/001; H04W 4/003; H04W 4/005; H04W 4/06; H04W 4/16; H04W 8/00; H04W 8/26; H04W 28/00; H04W 92/00
(Continued)

(56) References Cited

U.S. PATENT DOCUMENTS 8,180,860 B2    5/2012   Bovell et al.
8,660,608 B2    2/2014   Schell et al.
(Continued)

FOREIGN PATENT DOCUMENTS

EP    2071467 A1    6/2009

OTHER PUBLICATIONS

Taiwanese Patent Application No. 100141451—Office Action dated Dec. 13, 2013.
(Continued)

*Primary Examiner* — Jean Gelin
(74) *Attorney, Agent, or Firm* — Downey Brand LLP

(57) ABSTRACT

Apparatus and method for maintaining hardware history profiles for a software-based emulator. In one embodiment, the disclosed software-based emulator monitors the history of the actual hardware device in a secondary device history, the history of the emulated hardware is presented within a primary device history. However, the primary device history is linked to the secondary device history, and receives the device wear history therefrom. In another aspect of the present invention, wear-leveling strategies are disclosed for handling various update sizes. Unlike existing solutions which are optimized for a single SIM that receives small data updates; various embodiments of the present invention are suitable for handling varying data sizes.

20 Claims, 7 Drawing Sheets

Related U.S. Application Data continuation of application No. 13/294,631, filed on Nov. 11, 2011, now Pat. No. 8,660,608.

(60) Provisional application No. 61/413,317, filed on Nov. 12, 2010.

(51) Int. Cl.
  *H04W 88/06* (2009.01)
  *H04W 48/18* (2009.01)
  *G06F 12/02* (2006.01)
  *H04W 4/00* (2018.01)
  *G06F 3/06* (2006.01)
  *H04W 8/18* (2009.01)

(52) U.S. Cl.
  CPC .......... *G06F 3/0631* (2013.01); *G06F 3/0664* (2013.01); *G06F 3/0679* (2013.01); *G06F 12/0246* (2013.01); *H04W 4/003* (2013.01); *H04W 8/183* (2013.01); *H04W 12/06* (2013.01); *H04W 48/18* (2013.01); *H04W 88/06* (2013.01); *G06F 2212/177* (2013.01); *G06F 2212/7211* (2013.01)

(58) Field of Classification Search
  USPC .......... 455/410, 411, 556.1, 556.2, 557, 558, 455/414.1, 432.1, 552.1, 412.1; 713/168, 713/193, 150, 156; 380/270; 726/5, 7, 8, 726/9; 711/111, 113, 115, 154, 206, 221
  See application file for complete search history.

(56) References Cited

U.S. PATENT DOCUMENTS

| | | | |
|---|---|---|---|
| 2004/0083335 A1* | 4/2004 | Gonzalez | G06F 12/0246 711/103 |
| 2005/0111666 A1 | 5/2005 | Blom et al. | |
| 2005/0120157 A1* | 6/2005 | Chen | G06F 13/385 710/313 |
| 2007/0118688 A1 | 5/2007 | Lee et al. | |
| 2007/0150689 A1* | 6/2007 | Pandit | G06F 3/0616 711/170 |
| 2007/0204128 A1* | 8/2007 | Lee | G06F 12/0246 711/173 |
| 2007/0260811 A1 | 11/2007 | Merry et al. | |
| 2008/0034259 A1* | 2/2008 | Ko | G06F 11/1441 714/718 |
| 2008/0065905 A1 | 3/2008 | Salessi | |
| 2008/0279005 A1 | 11/2008 | France | |
| 2008/0320214 A1* | 12/2008 | Ma | G06F 3/0613 711/103 |
| 2009/0100215 A1 | 4/2009 | Nochimowski | |
| 2009/0198869 A1 | 8/2009 | Mosek | |
| 2009/0209232 A1 | 8/2009 | Cha et al. | |
| 2009/0222639 A1 | 9/2009 | Hyvonen et al. | |
| 2009/0233583 A1 | 9/2009 | Weiner et al. | |
| 2010/0011156 A1* | 1/2010 | Yim | G06F 12/0246 711/103 |
| 2010/0017555 A1* | 1/2010 | Chang | G06F 12/0246 711/103 |
| 2010/0122019 A1* | 5/2010 | Flynn | G06F 12/0246 711/103 |
| 2010/0210304 A1 | 8/2010 | Huslak | |
| 2011/0131231 A1* | 6/2011 | Haas | G06F 11/1446 707/769 |
| 2011/0131406 A1 | 6/2011 | Jones et al. | |
| 2011/0161553 A1* | 6/2011 | Saxena | G06F 12/0246 711/103 |
| 2011/0195712 A1 | 8/2011 | Mucke et al. | |
| 2012/0011340 A1* | 1/2012 | Flynn | G06F 12/0246 711/171 |
| 2012/0011345 A1 | 1/2012 | Robertson et al. | |
| 2012/0108204 A1 | 5/2012 | Schell et al. | |
| 2012/0108206 A1 | 5/2012 | Haggerty | |
| 2012/0124290 A1 | 5/2012 | Kunimatsu et al. | |
| 2012/0135710 A1 | 5/2012 | Schell et al. | |
| 2013/0178159 A1 | 7/2013 | Xie et al. | |
| 2014/0248924 A1 | 9/2014 | Schell et al. | |

OTHER PUBLICATIONS

International Patent Application No. PCT/US2011/060447—International Search Report and Written Opinion dated Jun. 20, 2012.

* cited by examiner

APPARATUS AND METHODS FOR RECORDATION OF DEVICE HISTORY ACROSS MULTIPLE SOFTWARE EMULATIONS

CROSS-REFERENCE TO RELATED APPLICATIONS

This application is a continuation of U.S. patent application Ser. No. 14/188,623, filed Feb. 24, 2014, entitled "APPARATUS AND METHODS FOR RECORDATION OF DEVICE HISTORY ACROSS MULTIPLE SOFTWARE EMULATIONS," now U.S. Pat. No. 9,281,855, issued Mar. 8, 2016, which is a continuation of U.S. patent application No. 13/294,631, filed Nov. 11, 2011, entitled "APPARATUS AND METHODS FOR RECORDATION OF DEVICE HISTORY ACROSS MULTIPLE SOFTWARE EMULATIONS," now U.S. Pat. No. 8,660,608, issued Feb. 25, 2014, which claims priority to U.S. Provisional Application No. 61/413,317, filed Nov. 12, 2010, of the same title, each of which are herein incorporated by reference in their entirety.

FIELD

The present invention relates generally to the field of communications systems, and more particularly in one exemplary aspect, to wireless systems that allow user devices to authenticate to wireless networks (e.g., cellular networks, WLANs, WMANs, etc.) using access control clients.

BACKGROUND

Access control is required for secure communication in most prior art wireless radio communication systems. As an example, one simple access control scheme might comprise: (i) verifying the identity of a communicating party, and (ii) granting a level of access commensurate with the verified identity. Within the context of an exemplary cellular system (e.g., Universal Mobile Telecommunications System (UMTS)), access control is governed by an access control client, referred to as a Universal Subscriber Identity Module (USIM) executing on a physical Universal Integrated Circuit Card (UICC). The USIM authenticates the subscriber to the UMTS cellular network. After successful authentication, the subscriber is allowed access to the cellular network.

Typical implementations of SIM cards contain EEPROM (Electrically Erasable Programmable Read-Only Memory) or flash memory media for storing data (e.g., user data, etc.) Unfortunately, EEPROMs can only be erased a limited number of times before becoming unreliable. For this reason, internal memory controllers also track wear and movement of data. The memory controller uses so-called "wear-leveling" techniques to manage data accesses so that erasures and re-writes are evenly distributed. Wear-leveling ensures that no single area of the EEPROM media fails due to excessive write/erase cycling.

Existing USIM solutions are hard-coded to the physical UICC card media; the subscriber needs a new UICC to change USIM operation. This can be detrimental to both MNOs and subscribers; for example, if the authentication procedures are "broken" (e.g., via malicious "hacking" or other such activities), the subscriber must be issued a new UICC, and this process is both time consuming and expensive. Moreover, for reasons described in greater detail subsequently herein, the physical UICC only contains a single USIM entity; existing solutions are not suitable for handling multiple USIM profiles within the same UICC.

However, there are several benefits stemming from the physicality of the UICC card itself. Specifically, unlike software which can be replicated easily, the card is a physical element which is more difficult to reproduce. The physical barrier to reproduction provides tangible benefits for distribution, sale, piracy, etc. For example, a would-be software pirate cannot sell multiple copies of the same SIM card. Moreover, since "cloning" or copying a SIM card is generally illegal, the one valid physical card can be distinguished from illicit clones. Similarly, vendors can use typical inventory management procedures for SIM cards e.g., purchase, store, liquidate, etc. Moreover, some users perceive (whether correctly or not) the physical SIM card as somehow being more secure and less likely to be the subject of surreptitious copying or distribution since, inter glia, the card is ostensibly always in their possession.

Wear leveling is a technique for prolonging the longevity or service life of certain types of erasable computer storage media, such as flash memory used in USB flash drives or solid-state drives. EEPROM and flash memory media have individually erasable segments, each of which can only tolerate a limited number of use cycles before becoming unreliable. Some flash devices include one or more blocks with extended life that can be used by the memory controller to track the movement of data across various memory segments in order to facilitate tracking "wear".

Wear leveling is a mechanism which arranges data so that erasures and re-writes are distributed more evenly across the entire medium. In this way, no single memory block prematurely fails due to an inordinately high number of write cycles. Conventional file systems such as FAT, UFS, etc. were originally designed for use on magnetic media such as disk drives, and as such rewrite many data structures such as directories repeatedly to the same medium area.

However, wear leveling has heretofore been limited to certain types of devices and operating system constraints, and there has historically only been one USIM profile per card. Prior art wear leveling techniques are not suitable or optimizable for use with "virtual" access clients such as the inventive eSIMs developed by the Assignee hereof and described in greater detail subsequently herein for a variety of reasons discussed in greater detail below.

SUMMARY

The present invention addresses the foregoing needs by providing, inter alia, apparatus and methods for wear leveling for data associated with user or subscriber identification within wireless networks (e.g., cellular networks, WLANs, WMANs. etc.) using access control clients.

In a first aspect of the invention, a method for tracking hardware specific features is disclosed. In one embodiment, the method includes: loading an emulator with a first emulation program, wherein the emulation program monitors at least one hardware specific attribute within a primary device history; storing the at least one hardware specific attribute in a secondary device history; responsive to a request to load a subsequent emulation program: and loading the emulator with the subsequent emulation program; and preloading a corresponding hardware specific attribute with the stored at least one hardware specific attribute from the secondary device history.

In a second aspect of the invention, a method for wear leveling for use in conjunction with a virtual access client (e.g., eSIM) is disclosed.

In a third aspect of the invention, a computer-readable apparatus is disclosed. In one embodiment, the apparatus comprises a computer readable medium of a storage device that is configured to implement wear leveling for, inter alia, multiple virtual access clients.

In a fourth aspect of the invention, a mobile device having a wear-leveled access client storage apparatus is disclosed.

In a fifth aspect of the invention, a secure element is disclosed. In one embodiment, the secure element includes: first apparatus configured to load the secure element with a emulation program, wherein the emulation program monitors a wear-leveling history within the secure element; second apparatus in communication with the first apparatus and configured to store the wear-leveling history to an external memory; and third apparatus in communication with the external memory and configured to preload wear-leveling history within the secure element from the external memory.

Other features and advantages of the present invention will immediately be recognized by persons of ordinary skill in the art with reference to the attached drawings and detailed description of exemplary embodiments as given below.

DETAILED DESCRIPTION

Figure 1:
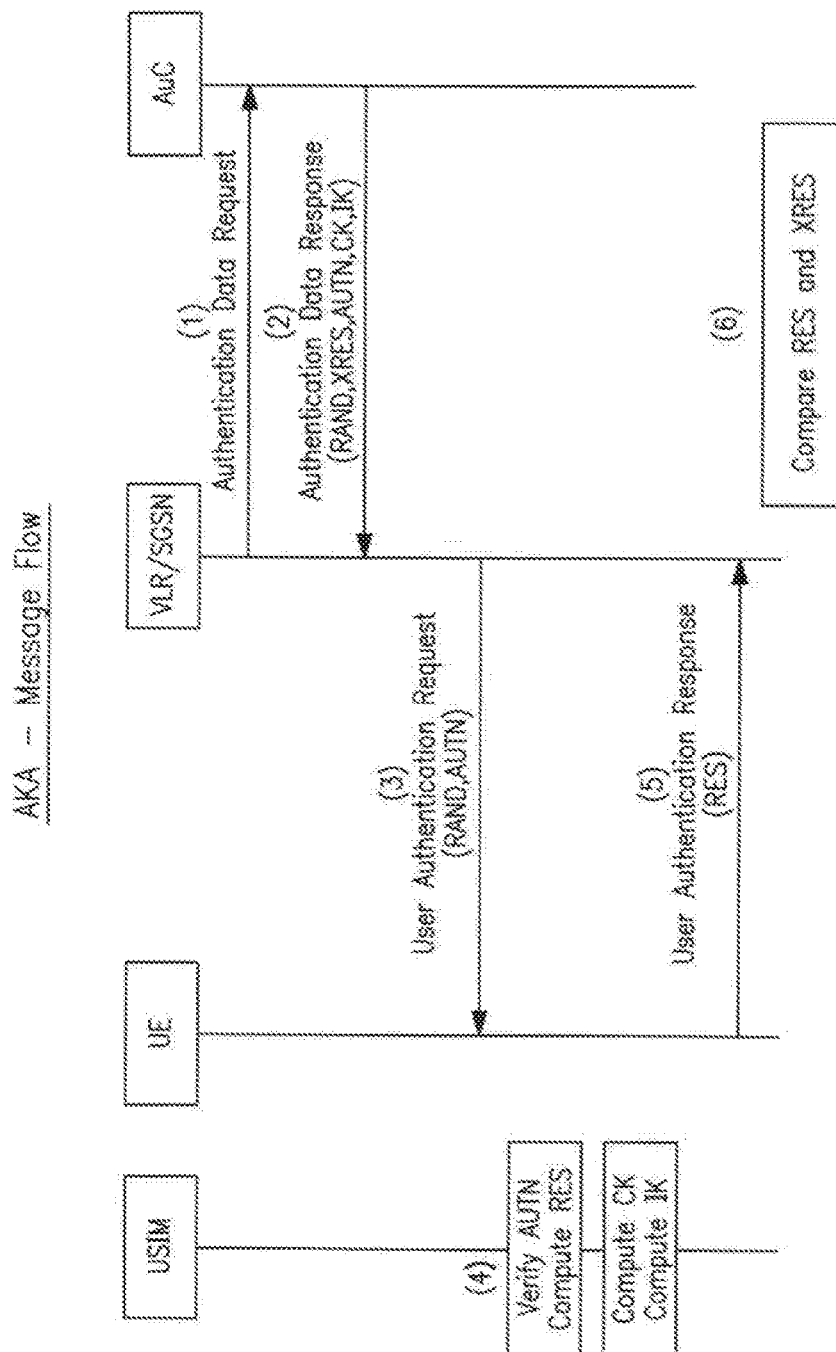
FIG. 1 illustrates an exemplary Authentication and Key Agreement (AKA) procedure using a prior art Universal Subscriber Identity Module (USIM).

Reference is now made to the drawings wherein like numbers refer to like parts throughout.

Overview

The present invention provides, inter alia, methods and apparatus for maintaining device history for multiple virtualized access control clients. As described in greater detail hereinafter, an Electronic Subscriber Identity Module (eSIM) is one embodiment of such an access client, being a "virtualized" Universal Subscriber Identity Module (USIM). A secure element of a user device (e.g., mobile device) can selectively run any one of multiple eSIMs stored locally; during operation the eSIM emulates the behavior of a USIM. Moreover, in one exemplary embodiment, each eSIM is isolated from other eSIMs during operation; i.e., each eSIM is a fully autonomous and individual software entity, in and of itself.

Within the context of eSIM-based operation, one exemplary implementation of the present invention supports wear-leveling across different eSIMs. In this implementation, wear-leveling information is tied to the secure element (e.g., secure storage device or secure micro), and not the eSIM. Moreover, wear-leveling strategies can be optimized to handle large-sized updates (such as new code or even substantial chunks of the operating system (OS)), as well as smaller sized data updates, and also removal and addition ("shuffling") of eSIMs on the secure element. In one exemplary embodiment, the wear-leveling information is securely stored within the secure element itself.

Moreover, as described in greater detail hereinafter, various aspects of the present invention can be broadly generalized to encompass device history information across virtualized hardware. For example, embodiments of the present invention may record and adapt memory operation for either or both of wear-leveling data and bad block memory management. Yet other various incarnations will be readily obvious to those of ordinary skill, given the contents of the present disclosure.

Exemplary embodiments of the present invention are now described in detail. While these embodiments are primarily discussed in the context of Subscriber Identity Modules (SIMs) of a GSM, GPRS/EDGE, UMTS cellular network, it will be recognized by those of ordinary skill that the present invention is not so limited. In fact, the various aspects of the invention are useful in any wireless network (whether cellular or otherwise) that can benefit from the use of virtualized hardware modules.

Moreover, while the following embodiments are primarily discussed in the context of wear-leveling techniques, it will be recognized by those of ordinary skill that the present invention is not so limited. In fact, the various aspects of the invention are useful in any hardware specific management operation, including for example bad block management, etc.

Prior Art Subscriber Identity Module (SIM) Operation

Within the context of the exemplary prior art UMTS cellular network, user equipment (UE) includes a mobile device and a Universal Subscriber Identity Module (USIM). The USIM is a logical software entity that is stored and executed from a physical Universal Integrated Circuit Card (UICC).

Generally, UICCs are programmed with a USIM prior to subscriber distribution; the pre-programming or "personalization" is specific to each network operator. For example, before deployment, the USIM is associated with an International Mobile Subscriber Identify (IMSI), a unique Integrated Circuit Card Identifier (ICC-ID) and a specific authentication key (K). The network operator stores the association in a registry contained within the network's Authentication Center (AuC). After personalization, the UICC can be distributed to subscribers.

Referring now to FIG. 1, one exemplary Authentication and Key Agreement (AKA) procedure 100 using the aforementioned prior art USIM is illustrated in detail. During normal authentication procedures, the UE 102 acquires the International Mobile Subscriber Identifier (IMSI) from the USIM 104. The UE passes it to the Serving Network (SN) 106 of the network operator or the visited core network. The SN forwards the authentication request to the AuC of the Home Network (HN). The HN compares the received IMSI with the AuC's registry and obtains the appropriate K. The HN generates a random number (RAND) and signs it with K using an algorithm to create the expected response (XRES). The HN further generates a Cipher Key (CK) and an Integrity Key (IK) for use in cipher and integrity protection as well as an Authentication Token (AUTN) using various algorithms. The HN sends an authentication vector, consisting of the RAND, XRES, CK, and AUTN to the SN. The SN stores the authentication vector only for use in a one-time authentication process. The SN passes the RAND and AUTN to the UE.

Once the UE 102 receives the RAND and AUTN, the USIM 104 verifies if the received AUTN is valid. If so, the UE uses the received RAND to compute its own response (RES) using the stored K and the same algorithm that generated the XRES. The UE passes the RES back to the SN. The SN 106 compares the XRES to the received RES and if they match, the SN authorizes the UE to use the operator's wireless network services.

In addition to the USIM logical software entity, a variety of other information is stored in the USIM such as subscriber information, as well as the keys and algorithms used for authentication with the network operator in order to obtain wireless network services. Common implementations of SIM card physical media comprise an EEPROM or flash based memory media for data storage.

EEPROM Memory Management

As a brief aside, EEPROM (Electrically Erasable Programmable Read-Only Memory) based memories generally use a floating-gate transistor to represent data. Single-level cell (SLC) devices can store one bit of information in a gate (i.e., electrons are present, or not present). Recent advancements have enabled multi-level cell (MLC) devices that can store more than one bit of information by using multiple levels of electrical charge.

The mechanism for charging and discharging the floating-gate transistor will eventually destroy the memory component, so each cell has a finite life. Accordingly, EEPROMs only write to the bits that change, to minimize the amount of charging and discharging. Flash memories operate on the same principle as EEPROM; however, flash memories erase large blocks of memory cells and write contents anew each time. While flash memories have a shorter lifespan than EEPROM memories, flash memories can be written much faster than their EEPROM counterparts.

Figure 2:
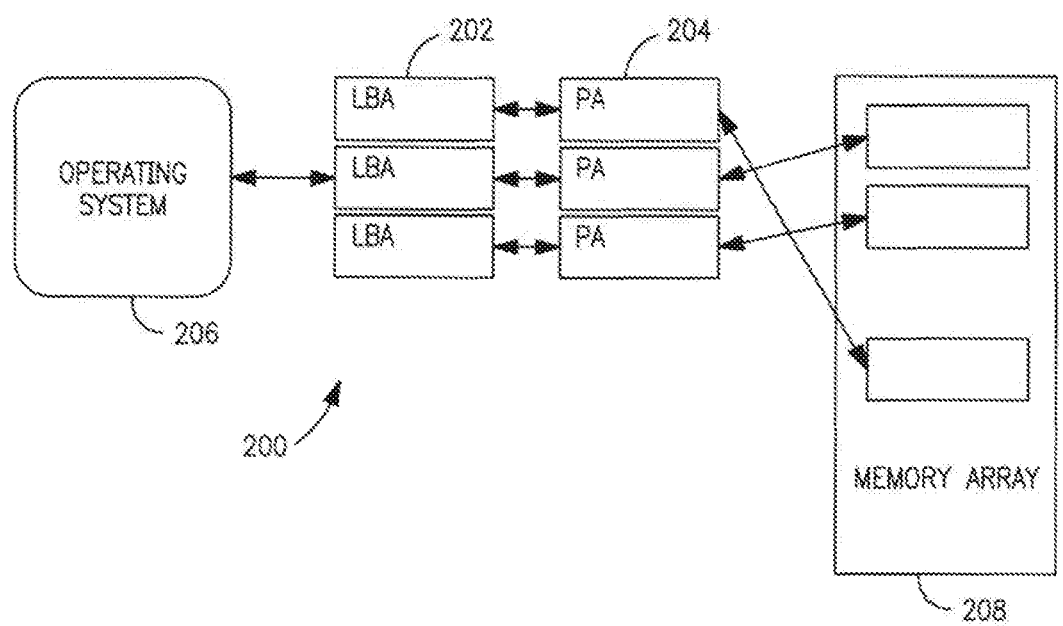
FIG. 2 is a graphical representation of one embodiment of a wear-leveling approach according to the invention.

As previously described, the destructive nature of writing EEPROM and flash components can be tempered with wear-leveling techniques. As shown in FIG. 2, wear-leveling aims to increase memory lifetime by distributing write accesses across the memory array, based on the previous tracked usage of the device. In some variants, the wear-leveling algorithm tracks the usage for a group of cells (e.g., by sector, by block, etc.) Specifically, the wear-leveling algorithm links Logical Block Addresses (LBAs) 202 to physical memory addresses 204. Each time a storage driver 206 writes to an LBA, the map is updated so that the current physical address is marked as invalid data, and a new physical address is linked to that LBA. Consequently, high frequency accesses to any individual LBA will be spread across the memory array 208. Wear-leveling techniques are generally classified as: (i) dynamic, and (ii) static. In dynamic wear-leveling each time data is written to a LBA it is written to a new location selected from the currently invalid data locations. However, only the "dynamic" data is being recycled. Cells that have static data (i.e., which has not been accessed) will have very low usage. In contrast, static wear-leveling occasionally rotates static data, so that low usage cells are rotated into the pool of invalid data. This rotational effect enables the memory to operate until most of the cells are near their end of life. Dynamic leveling generally provides faster performance, yet at the expense of shorter memory longevity.

Another method for improving EEPROM and flash component lifetimes is bad block memory management (BBM). When a logical block is accessed by high-level software, it is mapped to a physical block by the device driver or controller. A number of blocks on the flash chip may be set aside for storing mapping tables to deal with bad blocks, or the system may simply check each block at power-up to create a bad block map in RAM. The overall memory capacity gradually shrinks as more blocks are marked as bad.

Virtualized SIM Card

Various aspects of the present invention are now discussed with respect to one exemplary implementation of a virtualized Subscriber Identification Module (SIM) card, referred to hereinafter as an electronic SIM or eSIM. In the context of the exemplary embodiment of the present invention, instead of using a prior art SIM card, the UICC is emulated as a virtual or electronic entity such as e.g., a software application, hereafter referred to as an Electronic Universal Integrated Circuit Card (eUICC), that is contained within a secure element (e.g., secure microprocessor or storage device) in a mobile device. The eUICC is capable of storing and managing multiple SIM elements, referred hereafter as Electronic Subscriber Identity Modules (eSIM). Each eSIM contains the same data of a typical SIM. The eUICC selects an eSIM based upon the eSIM's ICC-ID. Once the eUICC selects the desired eSIM(s), the UE can initiate an authentication procedure to obtain wireless network services from the eSIM's corresponding network operator (as previously described in FIG. 1, and accompanying discussion).

Figure 3:
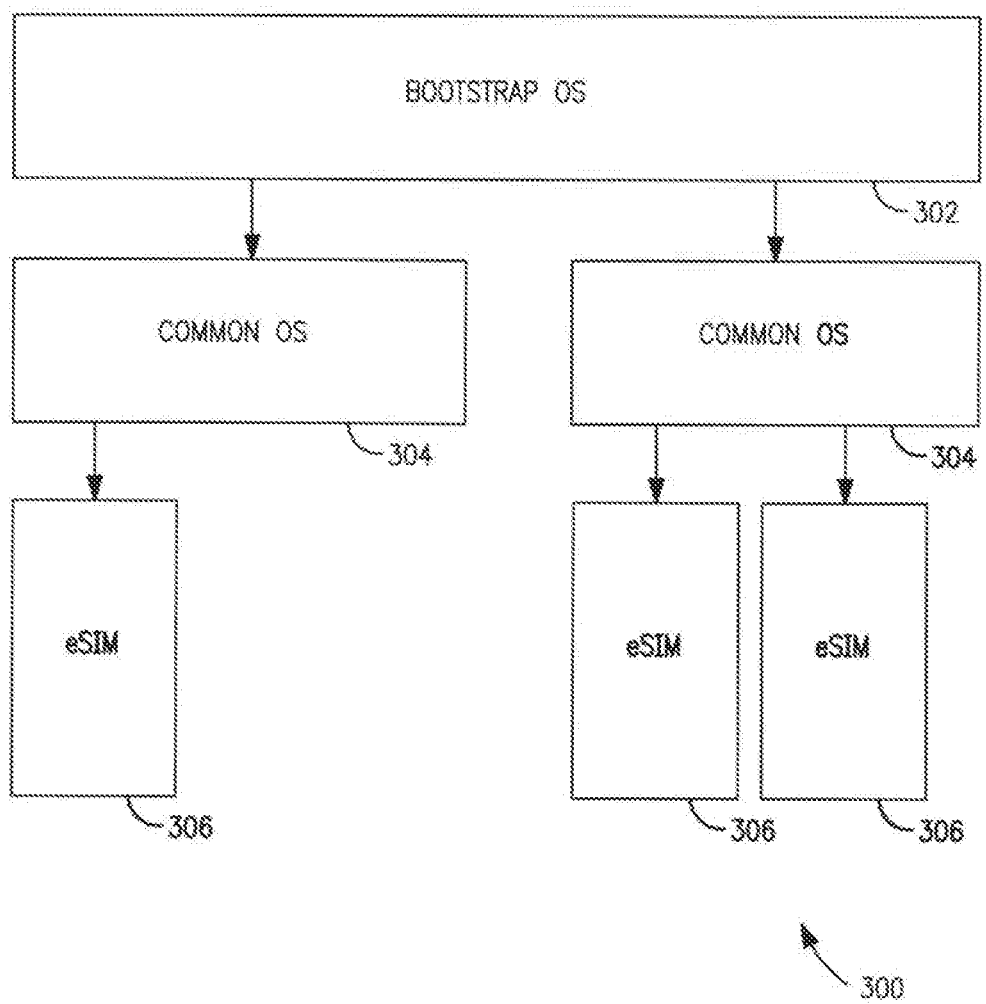
FIG. 3 is a graphical representation of one exemplary software architecture useful in conjunction with various embodiments of the present invention.

FIG. 3 illustrates one exemplary software architecture 300 comprising: (i) a bootstrap operating system (OS) 302, (ii) multiple common OSs 304, and (iii) multiple eSIMs 306. Most notably, as depicted in FIG. 3, different eSIMs 306 operate within their own common OSs 304. By separating the run time environments for the different eSIM profiles into distinct sandboxes, the illustrated embodiment advantageously remains compatible with legacy SIM architectures, but leverages the benefits of virtualized operation (see for example, the exemplary methods and apparatus for secure modification, storage and execution of access control entities or clients as described in co-owned U.S. Provisional Patent Application Ser. No. 61/407,866 filed on Oct. 28, 2010 and entitled "METHODS AND APPARATUS FOR STORAGE AND EXECUTION OF ACCESS CONTROL CLIENTS", previously incorporated herein). Generally, by ensuring that each eSIM is executed in its own environment, existing SIM software can be directly virtualized. Moreover, sandboxes ensure that the existence of other eSIMs will not cause adverse interaction, which is a requirement necessary to support a wide population of third-party eSIM vendors (e.g., which may have proprietary protocols, and capabilities, etc.)

During operation, the bootstrap operating system (OS) 302 loads a "common" or "resident" operating system 304, thereafter the common OS loads an appropriate eSIM 306. The bootstrap OS is responsible for cryptographic verification, decryption, and loading of the common OS, and all patches associated with an activated eSIM. As illustrated in FIG. 3 the bootstrap OS 302 is the only software which is always executed. However, the bootstrap OS is designed to only initialize software execution; after loading the OS and associated patches, the bootstrap OS exits.

Each of the common OSs 304 is implemented within the Java Card™ language. In prior art solutions, the Java Card language allows a Java Card applet to run on different SIM card technologies by using a Java Card virtual machine and a runtime library. Java Card applets are compiled to a generic bytecode (also referred to as an intermediate code); the virtual machine executes the bytecode using the card specific runtime library. In this way, the same bytecode can be used across multiple different platforms, provided the platform has an appropriate virtual machine. Thus, the Java Card language enables multiple different card manufacturers to use the same application software.

Within the software architecture of FIG. 3, the eSIMs 306 and associated common OSs 304 are "sandboxed"; they can only access appropriate patches made available through the eUICC. For example, the eUICC only enables execution of software which originated from the same entity (e.g., an eSIM vendor, etc.), or that share the same signatory as the eSIM (e.g., a trusted network carrier, etc.)

However, prior art solutions for wear-leveling techniques are inadequate when used for emulating multiple hardware elements. Specifically, existing wear-leveling techniques map logical block addresses (LBA) to physical address spaces of a secure media; however, implementation of wear-leveling is localized to each common OS 304. This is especially problematic when used in conjunction with hardware emulations which are no longer constrained by fixed physical parameters. For example, consider a secure element comprising 256 megabytes (MB) memory that supports multiple virtualized SIM cards of 128 kilobytes (KB) memory. Existing solutions for wear-leveling will restrict logical block addresses to the virtualized physical address space, rather than the physical address space of the actual device. Similarly, existing solutions for wear-leveling are restricted to the virtualized device size; and are poorly adapted for changes to size allocation (e.g., subsequent updates to increase or decrease the emulated device size, etc.) Furthermore, different types of hardware may perform wear-leveling differently (e.g., dynamic versus static, etc.).

Accordingly, what is needed is a method for sharing the wear-leveling data between common OSs. Ideally, solutions should enable wear-leveling to suit the capabilities and requirements of the actual physical storage device, rather than the virtualized hardware element.

Methods

Figure 4:
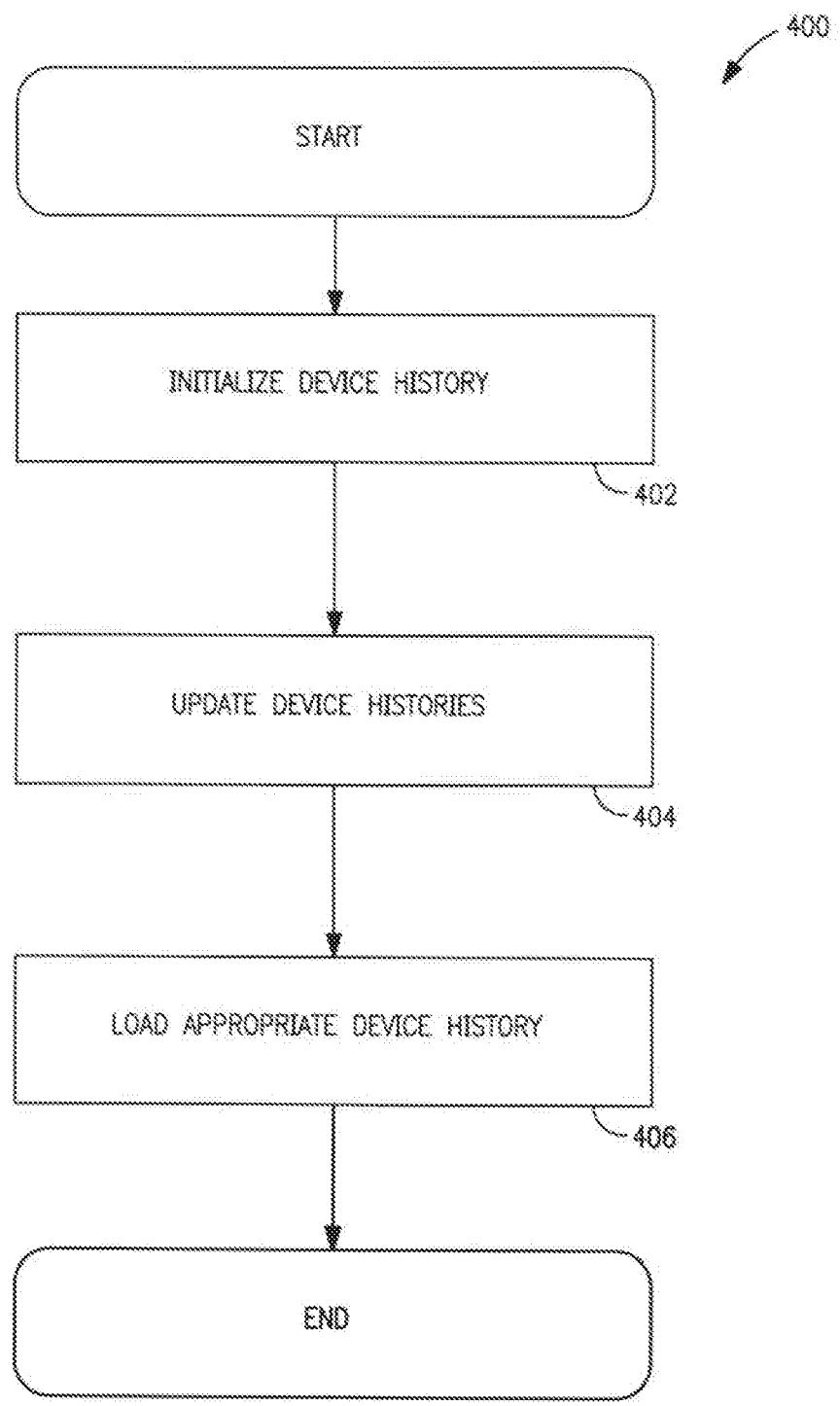
FIG. 4 is a logical flow diagram illustrating one embodiment of a generalized method for sharing device history information across virtualized hardware, according to the invention.

Referring now to FIG. 4, one embodiment of a generalized method for sharing device history information across virtualized hardware. In one exemplary embodiment, wear-leveling data is shared between virtualized eSIMs. In alternate embodiments the data may be related to usage history, bad block allocation, etc. In yet other embodiments, the virtualized hardware is a virtualized memory component, smart card, etc.

In another aspect of the present invention, wear-leveling information and commands are modified to suit the actual device, rather than the virtualized hardware. Specifically, in one exemplary embodiment, sizing of (or other associated parameters of) wear-leveling information is adjusted appropriate to the size of the physical element.

At step 402, one or more primary device histories, and secondary history is initialized. For example, a secure element allocates one or more virtualized hardware address spaces, and associated primary device histories from an actual hardware address space and a secondary device history. For instance, an eUICC assigns virtualized hardware address space commensurate to an eSIM size from the eUICC's actual address space. The wear-leveling data associated with the assigned space is provided to "seed" the virtualized wear-leveling data.

In one exemplary embodiment, the one or more primary device histories are accessible by a corresponding virtualized hardware element. The secondary device history may also be coupled to securely update the one or more primary device histories (so as to enable the actual physical hardware capabilities to change the primary device history; e.g., to enable static wear-leveling of the actual physical device).

In one implementation, the one or more primary device histories correspond to an emulated memory component for use with an electronic Subscriber Identity Module (eSIM). In one variant, the emulated memory component has properties and interfaces corresponding to an EEPROM (Electrically Erasable Programmable Read-Only Memory); alternately, in one variant, the emulated memory component has properties and interfaces corresponding to a flash memory device. For example, common virtualized hardware devices are EEPROMs of 32 KB, 64 KB, 128 KB, 256 KB, etc.

The one or more primary device histories may be implemented as e.g., a table or other data structure comprising a first series of logical block addresses sized according to a corresponding virtualized hardware device, and a second set of virtualized hardware addresses matching thereto. In one variant, the table additionally comprises a third series of usage counts, each usage count associated with a corresponding one of the second set of physical data.

The secondary device history may be implemented as e.g., a table or other data structure of a first series of virtualized hardware addresses and a second set of physical addresses, the foregoing sized appropriate to the physical device. In one variant, the table additionally comprises a third series of usage counts, each usage count associated with a corresponding one of the second set of physical data.

In yet another exemplary embodiment, the one or more primary device histories comprise a table or other data structure comprising a first series of logical block addresses sized according to a corresponding virtualized hardware device, and a second set of cached data matching to a virtualized hardware address. The virtualized hardware addresses are used within the secondary device history to map to a second set of physical addresses. The data located at the second set of physical addresses is loaded to the primary device histories for caching.

Figure 4A:
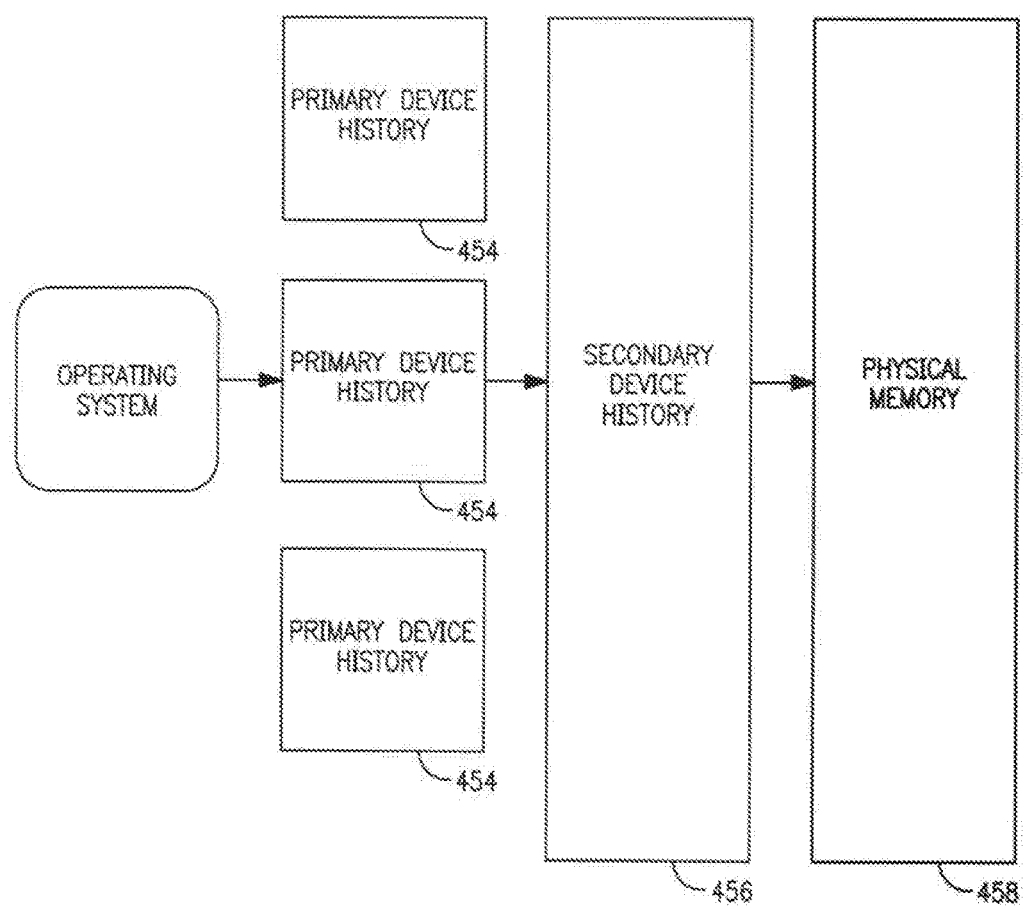
FIG. 4A is a logical block diagram illustrating one embodiment of an architecture wherein primary device histories address a virtualized hardware address space of a secondary device history.

In one embodiment, the one or more primary device histories 454 are linked to corresponding areas of the secondary device histories 456. For example, as illustrated in FIG. 4A, each of the primary device histories addresses a virtualized hardware address space of the secondary device histories, although other schemes may be used with equal success consistent with the invention.

In one embodiment, the secondary device history is securely stored within, and corresponds to, the actual physical device 458. For example, the physical device may be many times larger than the virtualized hardware elements it is intended to support. A physical device may comprise e.g., a 256 megabytes (MB), whereas a common virtualized SIM card comprises 128 kilobytes (KB). In this case, a primary device history only needs to track the 128 KB of address space, whereas the secondary device history would track usage of the entire 256 MB space. It is appreciated that the actual physical device may persistently store multiple virtualized hardware elements. Similarly, the actual physical device may have capacity for additional redundancy, additional functionality, backup operations, etc.

At step 404, responsive to a primary device history being written to, the secondary device history is updated. For example, during a write, the primary wear-leveling look-up table or other structure is updated to reflect a new mapping of the logical block address to a new physical address. The secondary wear-leveling look-up table/structure is also updated to match the primary wear-leveling look-up table/structure.

In one embodiment, the primary device history is coupled to a wear-leveling algorithm specific to a virtualized hardware application. The wear-leveling algorithm responsively maps a logical block address to an address within the virtualized hardware application when performing write accesses, and marks the previous address within the virtualized hardware application data as invalid. In one variant, the wear-leveling algorithm performs dynamic wear-leveling by only mapping logical block addresses to invalid addresses within the virtualized hardware application. In another variant, the wear-leveling algorithm performs static wear-leveling by occasionally remapping lightly-used logical block addresses to different addresses within the virtualized hardware application.

In one embodiment, the primary device history is coupled to a bad block management algorithm specific to a virtualized hardware application, wherein the bad block management algorithm maps a logical block address to an address within the virtualized hardware application only when the virtualized hardware address has been corrupted. In one such variant, corruption of a virtualized hardware address is verified after each write to the virtualized hardware address, by ensuring that the currently written data is not corrupted. If the written virtualized hardware address data does not match the written value, then the virtualized hardware address data is a bad block, and mapped to a new physical block.

In yet other embodiments, the primary device history mapping algorithms are replaced with pass-through operations (i.e., the virtualized hardware address is a trivial transformation, or untransformed variant of the logical block address). While this is much more efficient, this may or may not be desirable, depending on the degree of flexibility with legacy software.

The secondary device history may also be coupled to a wear-leveling algorithm specific to the actual physical device, such as where the wear-leveling algorithm responsively maps a virtualized hardware address (received from the virtualized hardware device) to an actual physical address when performing write accesses, and marks the previous physical address data as invalid. In one variant, the wear-leveling algorithm performs dynamic wear-leveling by only mapping virtualized hardware address to invalid physical addresses. In another variant, the wear-leveling algorithm performs static wear-leveling by occasionally remapping lightly used virtualized hardware addresses to different physical addresses.

The secondary device history may also be coupled to a bad block management algorithm to the actual physical device, such as where the bad block management algorithm maps a virtualized hardware address to a new physical address only when the physical address has been corrupted. In one such variant, corruption of a physical address is verified after each write to the physical address, by ensuring that the currently written data is not corrupted. If the written physical address data does not match the written value, then the physical address data is a bad block, and mapped to a new physical block.

In one embodiment, accesses are performed to the primary device history, and then the secondary device history is accessed. This may be useful for faster or simpler implementations, where the primary device history is allowed to operate within a set of virtualized hardware address space, within a cached address space, with a dynamic wear-leveling scheme, etc. In alternate embodiments, the secondary device history informs the updating of the primary device history. The secondary device history is a complete representation of the actual device history, and will provide inure optimal wear-leveling optimizations.

In some embodiments, the secondary device history is updated in bulk (i.e., several primary device history transactions are processed before updating the secondary device history). In other embodiments, the updates to the primary and secondary device histories are performed in lock step (i.e., one for one). In yet other embodiments, the method of updating the primary and secondary device histories is selected based on the currently selected virtualized hardware emulation. For example, certain types of virtualized hardwares may have different requirements and performances.

The updates may include e.g., one or more of logical block address, physical address, usage counts, cached data, etc. The device history updates may be symmetric, or alternately may be asymmetric. For example, a primary device history may update a logical block address with a new virtualized hardware address, whereas the secondary device may update the virtualized hardware address, the actual physical address, and increment a count for the physical address.

In some embodiments, the different types of wear-leveling algorithms may be used dependent upon the various types of virtualized hardware. For example, for a first eSIM profile, the wear-leveling algorithm may be based on dynamic wear-leveling, whereas for a second eSIM profile the wear-leveling algorithm may be based on static wear-leveling. In another such example, a first eSIM profile may use wear-leveling, whereas a second eSIM profile may use bad block management techniques. Hybridized or composite approaches are also envisaged as part of the invention.

In this manner, the secondary device history is kept appraised of the actions of the primary device history. The primary device history remains persistent for each device profile, and the secondary device history represents a history of the actual device usage.

At step 406, responsive to loading a new virtualized hardware element, loading the associated virtualized hardware address space and primary device history from the actual physical addresses and secondary device history. In one exemplary embodiment of the present invention, when a user changes eSIMs, the eSIM and associated wear-leveling history is loaded from the secure element. In some alternate embodiments, when a user changes eSIMs, only the eSIM is loaded, the associated wear-leveling history for that eSIM is started anew. Such embodiments can be used for example with "pass through" type embodiments, and rely more heavily on the secondary device history wear-leveling.

In one embodiment, the loading of the virtualized device and the primary device history is performed as a standard step of the bootstrap operating system. Specifically, when the bootstrap operating system loads the common OS, eSIM and patches associated therewith, the bootstrap OS transfers contents of the secondary device history to the primary device history.

The bootstrap OS may also be configured to load the entire address space and primary device histories associated with an eSIM. For example, where a bootstrap OS selects an eSIM emulating a 128 KB SIM device, the bootstrap OS transfers an appropriate 128 KB of space and associated wear-leveling history.

In alternate embodiments, the bootstrap OS transfers a relevant subset of the secondary device history. For example, where a bootstrap OS selects an eSIM emulating a 128 KB SIM device, the bootstrap OS only transfers the persistent subset of the secondary device history, the remaining portion of the emulated space is not transferred, and is considered uninitialized data.

After loading the appropriate virtualized hardware and associated primary device history, the operation returns to step 404.

Within the context of the one or more virtualized hardware and the actual device, subsequent changes to the size of any of the primary device histories associated with a corresponding virtualized hardware can be readily implemented without impacting the secondary device history of the actual device. As described in greater detail hereinafter, subsequent changes to the virtualized hardware size (e.g., increasing or decreasing the virtualized hardware size) can be performed by allocating or deallocating corresponding entries for the primary device history from the secondary device history. For example, changing the size allocation of a 128 KB eSIM can be performed without loss or padding of wear-leveling history. The wear-leveling history is tied to the actual physical secure element, not the emulated 128K eSIM.

Figure 5:
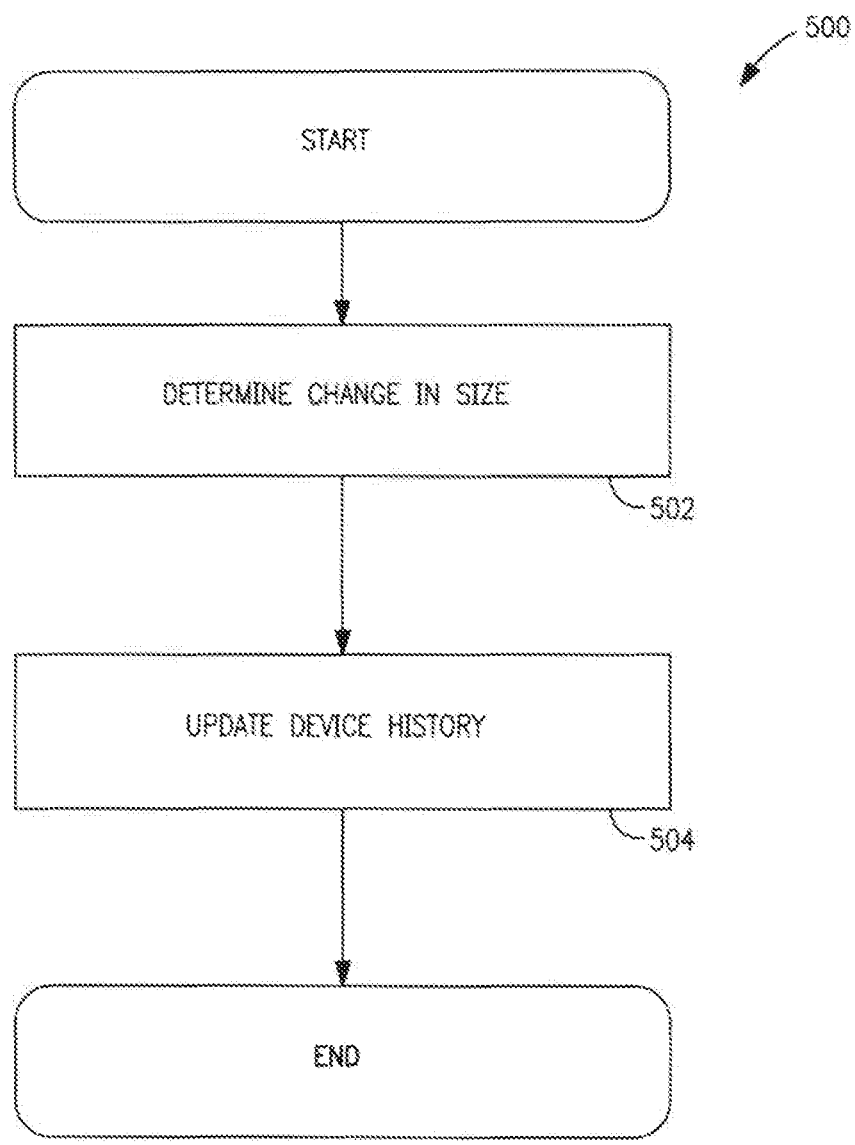
FIG. 5 is a block diagram of one embodiment of a generalized method for arbitrarily changing the size of one or more virtualized hardware elements, according to the invention.

FIG. 5 illustrates one embodiment of a generalized method for arbitrarily changing the size of one or more virtualized hardware elements according to the invention.

At step 502, responsive to receiving a change a virtualized hardware profile, the required primary device history size is determined. In one exemplary embodiment, a change in a virtualized hardware profile is delivered via an update. For example, during an over-the-air update, the update package may be very large (e.g., an operating system update, or software patch), or can be very small (e.g., a change to a network parameter). Alternatively, the change in the hardware profile may be delivered via a wired connection (e.g., during docking, etc.)

In one variant, the update is a change to an existing data entry. In other variants, the update entails the addition of new data entry. In yet other variants, the update entails the removal of an existing data entry. For example, receiving an update to an operating system component may require more virtualized hardware address space than is currently available for the virtualized hardware. In some implementations, the virtualized hardware size is assigned and returned in increments (e.g., byte size increments, block size increments, etc.) In other such embodiments, the required virtualized hardware size has fixed sizes (e.g., 32 KB, 64 KB, 128 KB, and 256 KB, etc.) In either case, the necessary amount of additional or excess virtualized hardware is determined.

The virtualized hardware may be an eSIM, and the device history data comprises wear-leveling data of the types described supra. In alternate variants, the device history data comprises bad block management data.

At step 504, responsive to a change in virtualized hardware size, the corresponding primary device history size is updated as well. For example, if the virtualized hardware size must be increased, then the primary device history size is also increased, and a corresponding number of previously unused physical addresses are allocated new logical block addresses. In one embodiment, the primary device history data is populated with the stored secondary device history data corresponding to the newly mapped physical addresses.

Alternately, if the virtualized hardware size must be decreased, then the primary device history size is also decreased and a corresponding number of logical block addresses are destroyed, the corresponding physical addresses are invalidated and returned enables wear-leveling protection when used in conjunction with multiple virtualized hardware emulations.

Moreover, those of ordinary skill in the related arts will recognize that various aspects of the present invention greatly improve over limitations indirectly imposed by prior art wear-leveling strategies (i.e., that were optimized for a single SIM with many small data updates). For example, since wear-leveling is advantageously not tied to the virtualized hardware size in the exemplary embodiment, both large-sized updates (e.g., such as new code or even substantial chunks of OS), and small-sized data updates are equally feasible.

Furthermore, those having ordinary skill in the related arts will recognize that various business rules may be implemented in accordance with various aspects of the present invention. It is appreciated that more advanced eSIM capabilities may be offered at a higher premium than other eSIM. It is further appreciated that certain features discussed herein, such as the improved wear-leveling feature, may be structured to require advanced or upgraded subscriptions. Moreover, such features are substantially improved over and replace the existing SIM card technologies, and significant premiums can be attributed to the reliability and flexibility offered thereby.

Additionally, rules may be implemented to allow for updating eSIM data associated with a particular wear-leveling scheme. Support for larger update capabilities can improve both network efficiency and client downtime, both qualities having measurable monetary value.

Yet other features and uses for the present invention will be readily appreciated by one of ordinary skill in the related arts, given the contents of the present disclosure.

Exemplary User Apparatus

Figure 6:
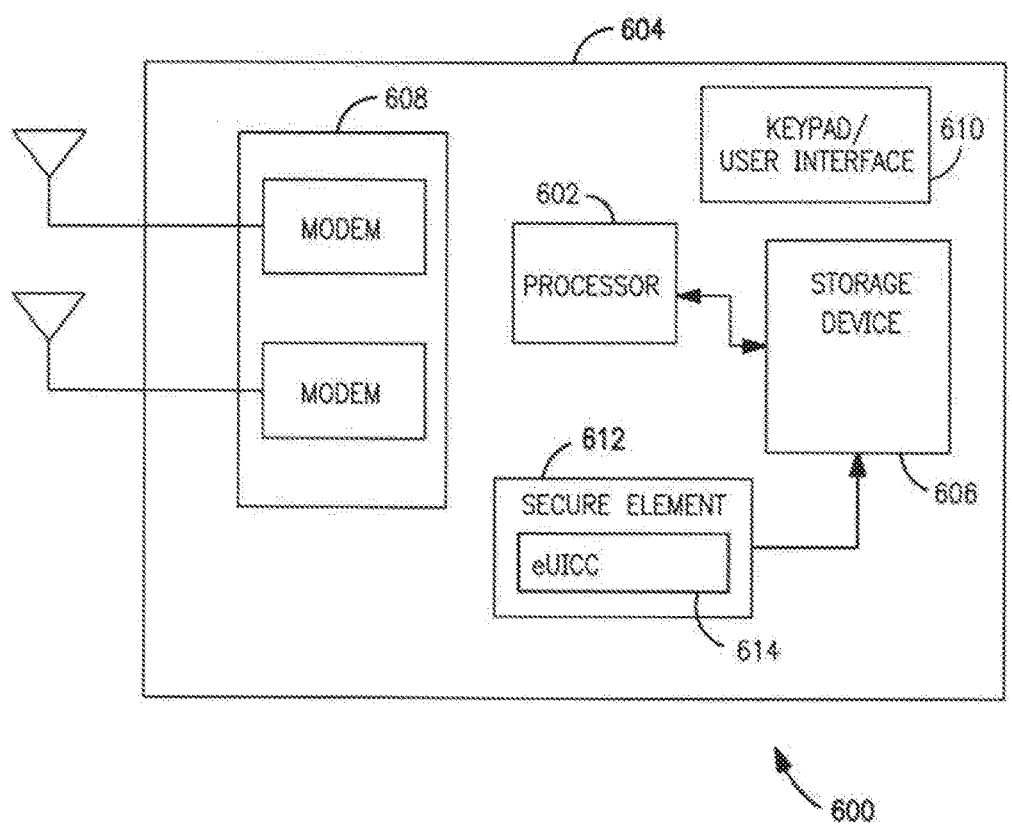
FIG. 6 is a block diagram illustrating an exemplary embodiment of a user device according to the invention.

Referring now to FIG. 6, one exemplary embodiment of apparatus useful for implementing the methods of the present invention is illustrated.

The exemplary user device (e.g., UMTS equipment or "UE") 600 of FIG. 6 is a wireless device with a processor subsystem 602 such as a digital signal processor, microprocessor, field-programmable gate array, or plurality of processing components mounted on one or more substrates 604. The processing subsystem may also comprise an internal cache memory. The processing subsystem is connected to a memory subsystem 606 comprising memory which may for example, comprise SRAM, flash and SDRAM components. The memory subsystem may implement one or a more of DMA type hardware, so as to facilitate data accesses as is well known in the art. The memory subsystem contains computer-executable instructions which are executable by the processor subsystem.

In one exemplary embodiment of the present invention, the device can include one or more wireless interfaces 608 adapted to connect to one or more wireless networks. The multiple wireless interfaces may support different radio technologies such as GSM, CDMA, UMTS, LTE/LTE-A, WiMAX, WLAN, Bluetooth, etc. by implementing the appropriate antenna and modem subsystems.

The user interface subsystem 610 includes any number of well-known I/O including, without limitation: a keypad, touch screen (e.g., multi-touch interface), LCD display, backlight, speaker, and/or microphone. However, it is recognized that in certain applications, one or more of these components may be obviated. For example, PCMCIA card-type client embodiments may lack a user interface (as they could piggyback onto the user interface of the host device to which they are physically and/or electrically coupled).

In the illustrated embodiment, the device includes a secure element 612 which contains and operates the eUICC application 614. The eUICC is capable of storing and accessing a number of primary device histories, and one master secondary device history. In one embodiment, the eUICC comprises a number of eSIMs, and associated wear-leveling data. In other embodiments, the eUICC comprises a number of eSIMs, and associated bad block management data.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A method for modifying a size of a virtualized memory associated with an emulation program, the method comprising:
   loading the emulation program that maintains:
      first usage information associated the virtualized memory, and
      second usage information associated with an underlying physical memory to which the virtualized memory corresponds, wherein the second usage information corresponds to (i) the emulation program, and (ii) at least one different emulation program; and
   processing an update that involves modifying the size of the virtualized memory associated with the emulation program, wherein, when the size is increased, aspects of the second usage information are populated into corresponding aspects of the first usage information to account for the updated size of the virtualized memory.

2. The method of claim 1, wherein the first usage information is associated with a historical usage of the virtualized memory.

3. The method of claim 2, wherein the historical usage comprises wear leveling information.

4. The method of claim 1, wherein the update comprises an over-the-air (OTA) update.

5. The method of claim 1, wherein, when the size is increased, the aspects represent a new area of the virtualized memory that is being utilized by the emulation program by way of the update.

6. The method of claim 1, wherein, when the size of the virtualized memory is decreased, the method further comprises:
   populating aspects of the first usage information into corresponding aspects of the second usage information.

7. The method of claim 6, wherein the aspects represent an old area of the virtualized memory that is no longer being used by the emulation program as a result of the update.

8. A non-transitory computer readable storage medium configured to store instructions that, when executed by a processor included in a computing device, cause the computing device to modify a size of a virtualized memory associated with an emulation program, by carrying out steps that include:
   loading the emulation program that maintains:
      first usage information associated the virtualized memory, and
      second usage information associated with an underlying physical memory to which the virtualized memory corresponds, wherein the second usage information corresponds to (i) the emulation program, and (ii) at least one different emulation program; and
   processing an update that involves modifying the size of the virtualized memory associated with the emulation program, wherein, when the size is increased, aspects of the second usage information are populated into corresponding aspects of the first usage information to account for the updated size of the virtualized memory.

9. The non-transitory computer readable storage medium of claim 8, wherein the first usage information is associated with a historical usage of the virtualized memory.

10. The non-transitory computer readable storage medium of claim 9, wherein the historical usage comprises wear leveling information.

11. The non-transitory computer readable storage medium of claim 8, wherein the update comprises an over-the-air (OTA) update.

12. The non-transitory computer readable storage medium of claim 8, wherein, when the size is increased, the aspects represent a new area of the virtualized memory that is being utilized by the emulation program by way of the update.

13. The non-transitory computer readable storage medium of claim 8, wherein, when the size of the virtualized memory is decreased, the steps further include:
   populating aspects of the first usage information into corresponding aspects of the second usage information.

14. The non-transitory computer readable storage medium of claim 13, wherein the aspects represent an old area of the virtualized memory that is no longer being used by the emulation program as a result of the update.

15. A computing device configured to modify a size of a virtualized memory associated with an emulation program, the computing device comprising:
   a processor configured to cause the computing device to carry out steps that include:
      loading the emulation program that maintains:
         first usage information associated the virtualized memory, and
         second usage information associated with an underlying physical memory to which the virtualized memory corresponds, wherein the second usage information corresponds to (i) the emulation program, and (ii) at least one different emulation program; and
      processing an update that involves modifying the size of the virtualized memory associated with the emulation program, wherein, when the size is increased, aspects of the second usage information are populated into corresponding aspects of the first usage information to account for the updated size of the virtualized memory.

16. The computing device of claim 15, wherein the first usage information is associated with a historical usage of the virtualized memory.

17. The computing device of claim 16, wherein the historical usage comprises wear leveling information.

18. The computing device of claim 15, wherein, when the size is increased, the aspects represent a new area of the virtualized memory that is being utilized by the emulation program by way of the update.

19. The computing device of claim 15, wherein, when the size of the virtualized memory is decreased, the steps further include:

populating aspects of the first usage information into corresponding aspects of the second usage information.

20. The computing device of claim 17, wherein the aspects represent an old area of the virtualized memory that is no longer being used by the emulation program as a result of the update.

* * * * *